(12) United States Patent
Ayva et al.

(10) Patent No.: US 11,111,839 B2
(45) Date of Patent: Sep. 7, 2021

(54) THERMAL ISOLATION OF COOLING CIRCUITS WITH A COMMON DEGAS BOTTLE FILLING PORT

(71) Applicant: Ford Global Technologies, LLC, Dearborn, MI (US)

(72) Inventors: Mursel Ayva, Brentwood (GB); Robert Alex Mitchell, Plymouth, MI (US); Eduardo Correia, Laindon (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 65 days.

(21) Appl. No.: 16/735,898

(22) Filed: Jan. 7, 2020

(65) Prior Publication Data

US 2021/0207522 A1 Jul. 8, 2021

(51) Int. Cl.
*F01P 11/02* (2006.01)
*F01P 7/14* (2006.01)

(52) U.S. Cl.
CPC .............. *F01P 11/029* (2013.01); *F01P 7/14* (2013.01); *F01P 11/0204* (2013.01)

(58) Field of Classification Search
CPC ......... F01P 11/0204; F01P 7/14; F01P 11/029
See application file for complete search history.

(56) References Cited

U.S. PATENT DOCUMENTS

| | | | |
|---|---|---|---|
| 6,216,646 B1 * | 4/2001 | Smith | F01P 11/029 123/41.54 |
| 8,336,319 B2 | 12/2012 | Johnston et al. | |
| 8,966,917 B2 | 3/2015 | O'Rourke et al. | |
| 10,222,134 B2 | 3/2019 | Gopal | |
| 2019/0170053 A1 * | 6/2019 | Mark | F01P 11/029 |

FOREIGN PATENT DOCUMENTS

FR 3016923 A3 7/2015

* cited by examiner

*Primary Examiner* — Kevin A Lathers
(74) *Attorney, Agent, or Firm* — Burr & Forman, LLP

(57) ABSTRACT

A vehicle cooling system includes a first cooling circuit having a first operating temperature range when the vehicle is in an operational state, a second cooling circuit having a second operating temperature range, and a degas bottle. The degas bottle has a first chamber operably coupled to the first cooling circuit and a second chamber operably coupled to the second cooling circuit. The degas bottle includes a fill port operably coupled to the second chamber and a flow restrictor disposed at a divider separating the first and second chambers. The flow restrictor is configured to open to enable cooling fluid provided via the fill port, when the vehicle is in a non-operational state, to flow from the second chamber to the first chamber and be closed when the vehicle is in the operational state to prevent the cooling fluid from flowing between the first and second chambers.

20 Claims, 7 Drawing Sheets

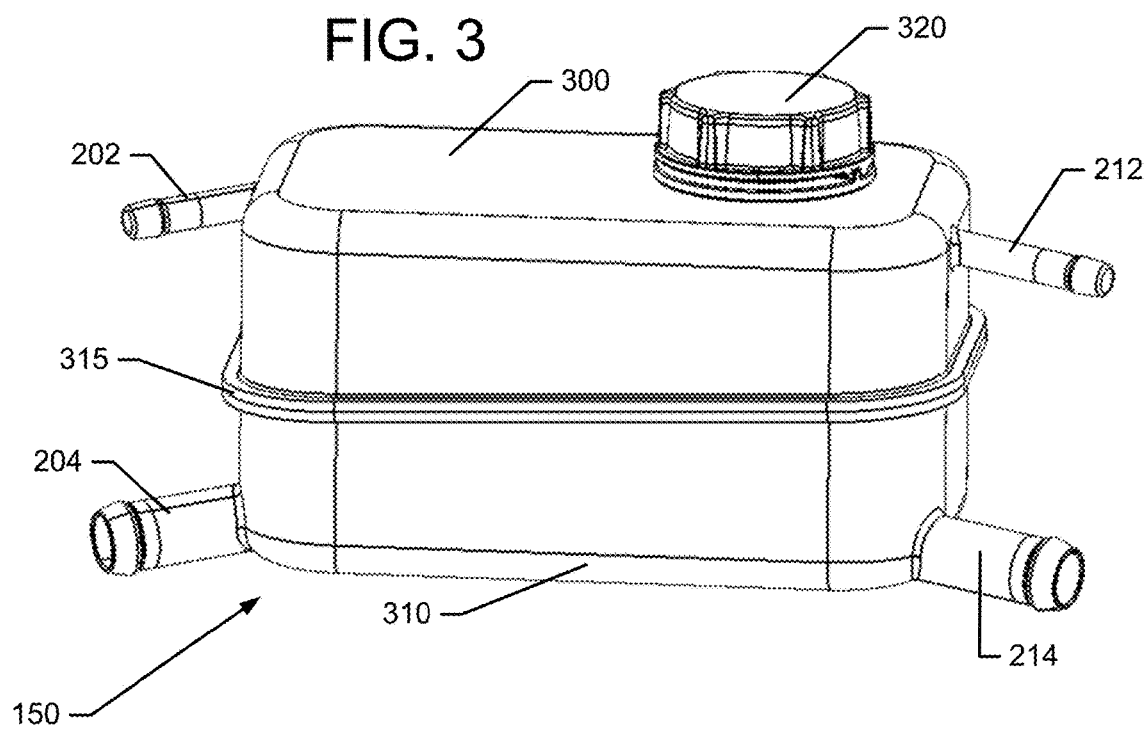
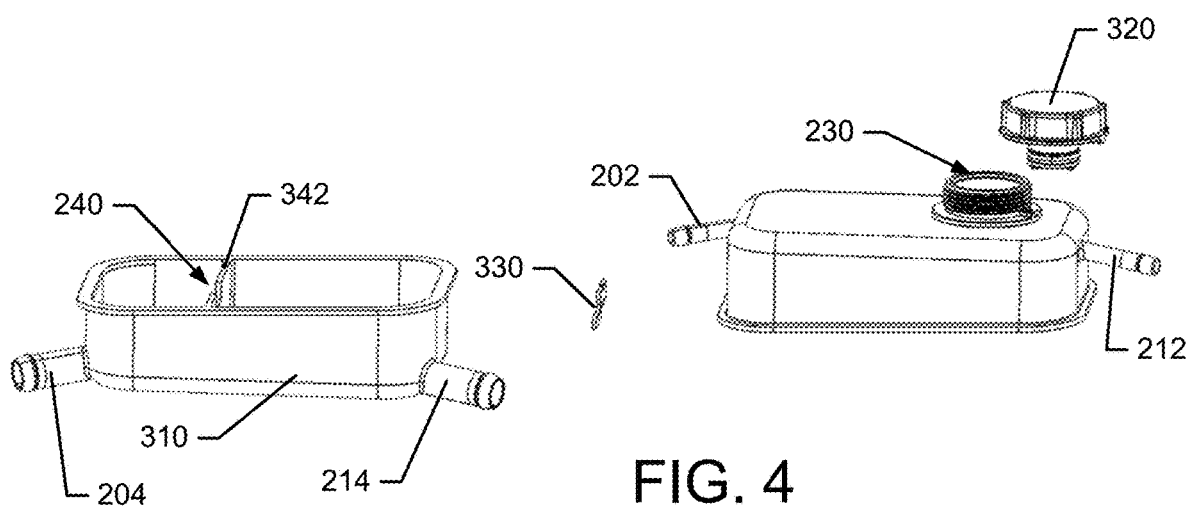

FIG. 8
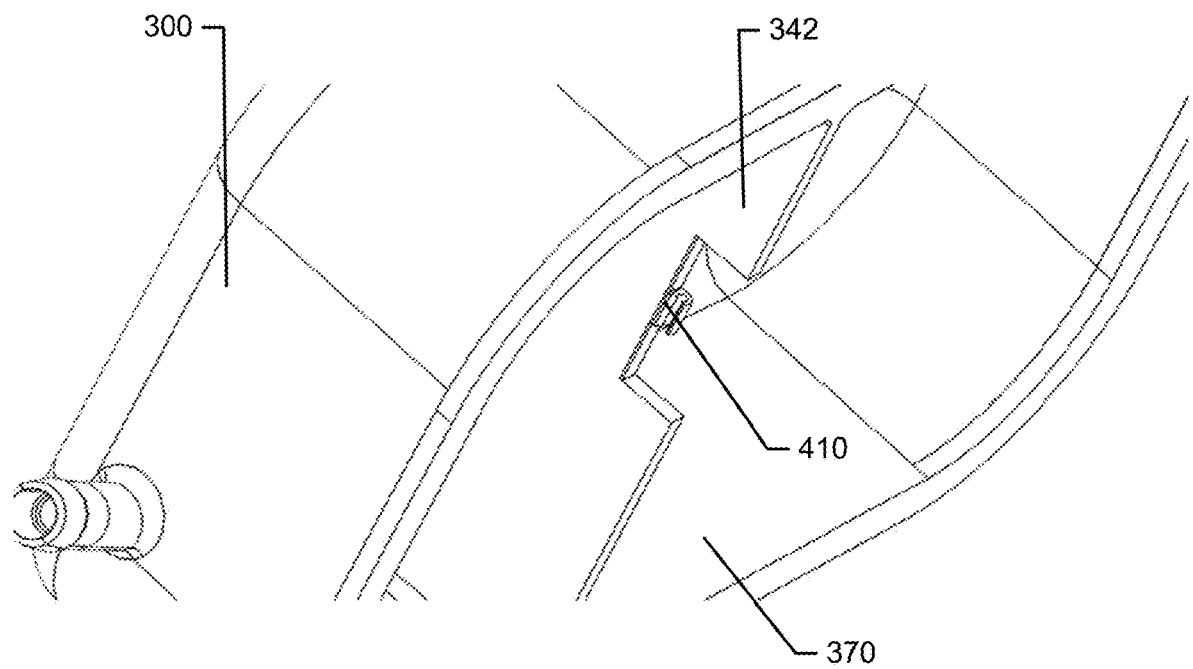
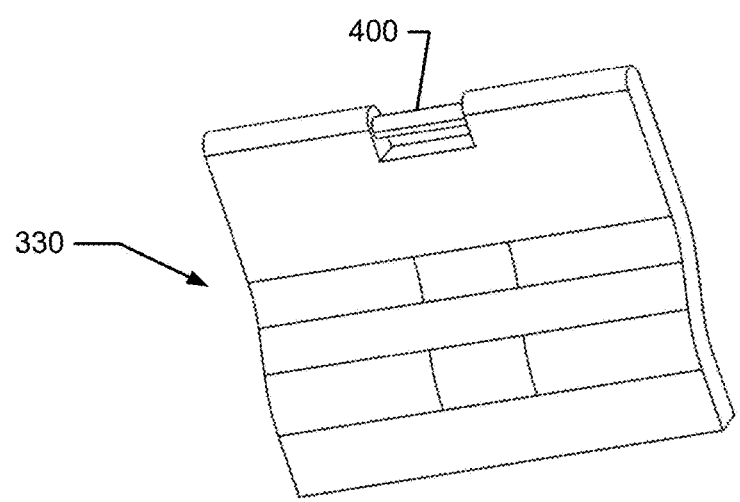
FIG. 9

THERMAL ISOLATION OF COOLING CIRCUITS WITH A COMMON DEGAS BOTTLE FILLING PORT

TECHNICAL FIELD

Example embodiments generally relate to vehicle cooling circuits and, more particularly, relate to a way to simultaneously fill two vehicle cooling circuits having different operating temperatures with cooling fluid while still keeping the circuits thermally isolated.

BACKGROUND

In automotive applications, a number of cooling circuits may be employed in order to cool various vehicle components. In some cases, individual components or component systems may have corresponding individual cooling circuits. As an example, a hybrid vehicle may include a main engine cooling circuit that may provide cooling to the main engine, along with two corresponding cooling circuits associated with providing cooling for the battery and the inverter unit, respectively. Each of these cooling circuits may operate and therefore also be maintained independently from one another. In particular, even though the inverter cooling circuit and the battery cooling circuit may use the same cooling fluid, they may nevertheless be maintained separate from each other due to the fact that the two circuits operate in different temperature ranges since operating temperature limits of the battery and the inverter are usually significantly different.

As a result of the isolation of these cooling circuits, additional service requirements are created and the complexity associated with conducting vehicle maintenance is increased. In this regard, each of the three cooling circuits mentioned above would typically have an independent filling process for the replacement or replenishment of cooling fluid. Moreover, each individual cooling circuit would also generally have a corresponding separate filling port at which the filling process could be undertaken. Cooling fluid is therefore added to three separate filling ports in three entirely separate actions.

Thus, it may be desirable to develop an alternative strategy for designing cooling circuit filling ports. In this regard, the provision of a structure or way by which to fill more than one thermally isolated cooling circuit using a single filling port may be desirable.

BRIEF SUMMARY OF SOME EXAMPLES

In accordance with an example embodiment, a vehicle cooling system may be provided. The vehicle cooling system may include a first cooling circuit having a first operating temperature range when the vehicle is in an operational state, a second cooling circuit having a second operating temperature range when the vehicle is in the operational state, and a degas bottle. The first operating temperature range may be higher than the second operating temperature range. The degas bottle may have a first chamber operably coupled to the first cooling circuit and a second chamber operably coupled to the second cooling circuit. The degas bottle may include a fill port operably coupled to the second chamber and a flow restrictor disposed at a divider separating the first chamber and the second chamber. The flow restrictor may be configured to open to enable cooling fluid provided via the fill port, when the vehicle is in a non-operational state, to flow from the second chamber to the first chamber and configured to be closed when the vehicle is in the operational state to prevent the cooling fluid from flowing between the first and second chambers.

In another example embodiment, a multi-circuit degas bottle for a vehicle cooling system is provided. The vehicle cooling system may include a first cooling circuit having a first operating temperature range when the vehicle is in an operational state, and a second cooling circuit having a second operating temperature range when the vehicle is in the operational state. The first operating temperature range may be higher than the second operating temperature range. The multi-circuit degas bottle may include a first chamber operably coupled to the first cooling circuit, a second chamber operably coupled to the second cooling circuit, a fill port operably coupled to the second chamber, and a flow restrictor disposed at a divider separating the first chamber and the second chamber. The flow restrictor may be configured to open to enable cooling fluid provided via the fill port, when the vehicle is in a non-operational state, to flow from the second chamber to the first chamber and configured to be closed when the vehicle is in the operational state to prevent the cooling fluid from flowing between the first and second chambers.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3 illustrates a perspective view of the multi-circuit degas bottle in an assembled state in accordance with an example embodiment;

FIG. 4 shows an exploded view of the multi-circuit degas bottle in accordance with an example embodiment;

FIG. 8 illustrates a perspective view of a mounting (or snap fit) socket for a flap hinge in accordance with an example embodiment;

FIG. 9 illustrates a perspective view of a flap that can be hinged to the mounting socket of FIG. 8 in accordance with an example embodiment.

DETAILED DESCRIPTION

Figure 1:
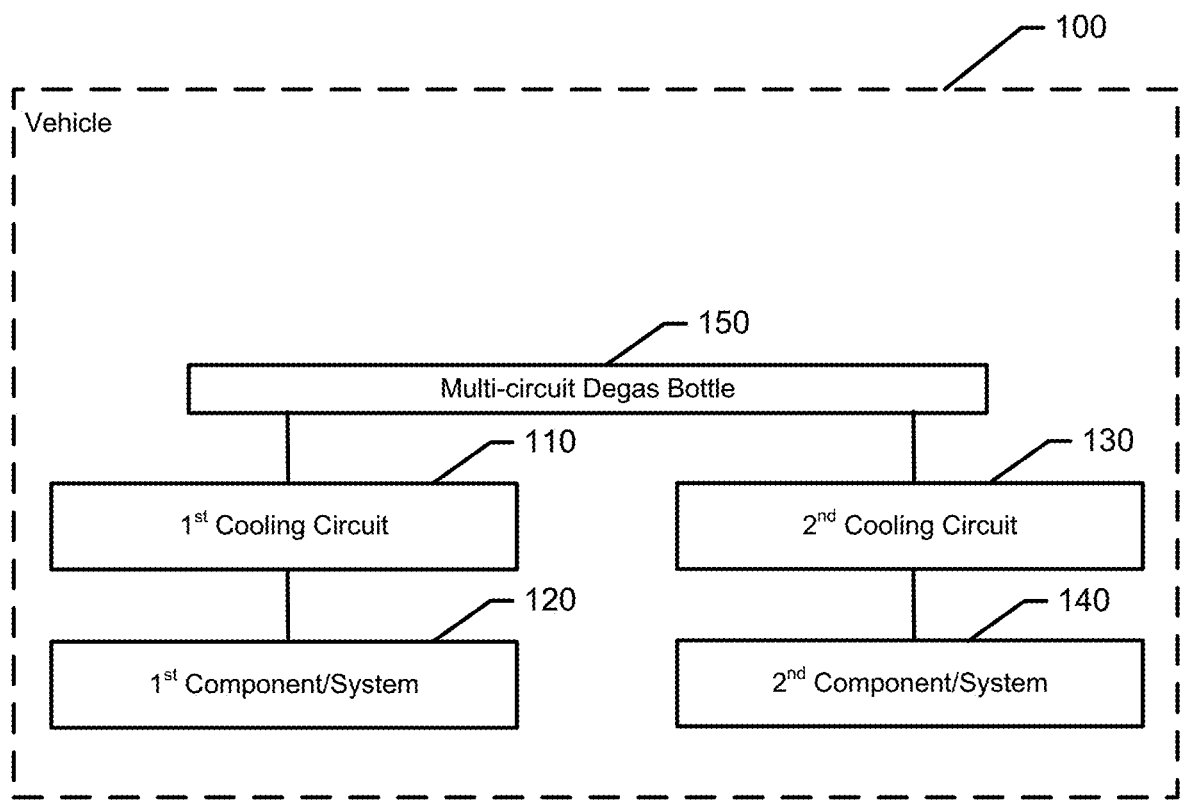
FIG. 1 illustrates a block diagram of a vehicle cooling system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide an improved design for enabling at least two cooling circuits to be filled with cooling fluid (e.g., automotive coolant) via a common filling port. In this regard, the common filling port may be provided as part of a common degas bottle that is shared between two cooling circuits that are otherwise thermally isolated. The challenge of maintaining the thermal isolation while still permitting both cooling circuits to be filled by one filling port is met by virtue of the design elements and structures described herein, which are exemplary of one way of employing an example embodiment. As a result, cost savings may be achieved by reducing overall component counts, and the complexity and time requirements associated with vehicle maintenance may be reduced.

FIG. 1 illustrates a block diagram of cooling circuits of a vehicle 100 of an example embodiment. As shown in FIG. 1, the vehicle 100 may include a first cooling circuit 110 and a second cooling circuit 120. However, as noted above, the vehicle 100 may include additional cooling circuits as well. Thus, although an example embodiment is described herein to show how two cooling circuits of the vehicle 100 are capable of being filled using a single filling port, it should be appreciated that the design elements described herein could be extended to operation with yet further cooling circuits of the vehicle 100 as well.

The first cooling circuit 110 may be operably coupled to a corresponding first component or system 120, and the second cooling circuit 130 may be operably coupled to a corresponding second component or system 140. The first component or system 120 of this example may be a component or system that operates at a relatively high temperature or generates a relatively large heat load (as compared to the second component or system 140). Meanwhile, the second component or system 140 may be a component or system that operates at a relatively low temperature or generates a relatively smaller heat load (as compared to the first component or system 120). In an example embodiment, the first component or system 120 may be an inverter assembly of the vehicle 100, and the second component or system 140 may be a battery unit of the vehicle 100.

The first cooling circuit 110 may include one or more heat exchangers or other heat transfer components that are configured to transfer heat from the first component or system 120 to cooling fluid of the first cooling circuit 110. The first cooling circuit 110 may then be further configured to enable the cooling fluid to transfer heat out of the first cooling circuit 110 (e.g., via a heat sink or other heat transfer interfaces). The cooling fluid may be moved within the first cooling circuit 110 via a pump, thermal driving head created within the system, or other methods of providing movement of the cooling fluid. Similarly, the second cooling circuit 130 may include one or more heat exchangers or other heat transfer components that are configured to transfer heat from the second component or system 140 to cooling fluid of the second cooling circuit 130. The second cooling circuit 130, which may move the cooling fluid within the second cooling circuit 130 similar to the way the cooling fluid is moved within the first cooling circuit 110, may then be further configured to enable the cooling fluid to transfer heat out of the second cooling circuit 130 (e.g., via a heat sink or other heat transfer interfaces).

The cooling fluid used in each of the first cooling circuit 110 and the second cooling circuit 130 may be the same type of automotive coolant. Thus, one thought for simplifying maintenance requirements may be to simply connect the first and second cooling circuits 110 and 130 together either through integration of the circuits, or through just using a common filling point for both circuits. Doing so would provide for sharing of the same cooling fluid within the combined system. However, as noted above, due to the different operating temperatures of the first component or system 120 and the second component or system 140, hydraulically linking the first and second cooling circuits 110 and 130 could cause dramatic impacts on respective ones of the circuits when the other circuit is experiencing a significant temperature change. These impacts may lead to significant performance degradation, and therefore should be avoided.

To provide for the advantage of enabling a single filling port to serve the first and second cooling circuits 110 and 130 without compromising the thermal isolation between the first and second cooling circuits 110 and 130, some example embodiments may provide a multi-circuit degas bottle 150 (referring to hereinafter simply as degas bottle 150). Degas bottles are commonly used in automotive engine coolant systems to de-aerate the cooling fluid while the cooling fluid operates within the corresponding cooling circuit. In conventional systems, each individual cooling circuit would be expected to have its own respective degas bottle, which typically also includes a filling port (e.g., with a corresponding cap). However, example embodiments may include the degas bottle 150 having the design elements and features described herein to enable one instance of a degas bottle to serve two otherwise thermally isolated cooling circuits to enable simultaneous cooling fluid filling or replenishment.

Figure 2:
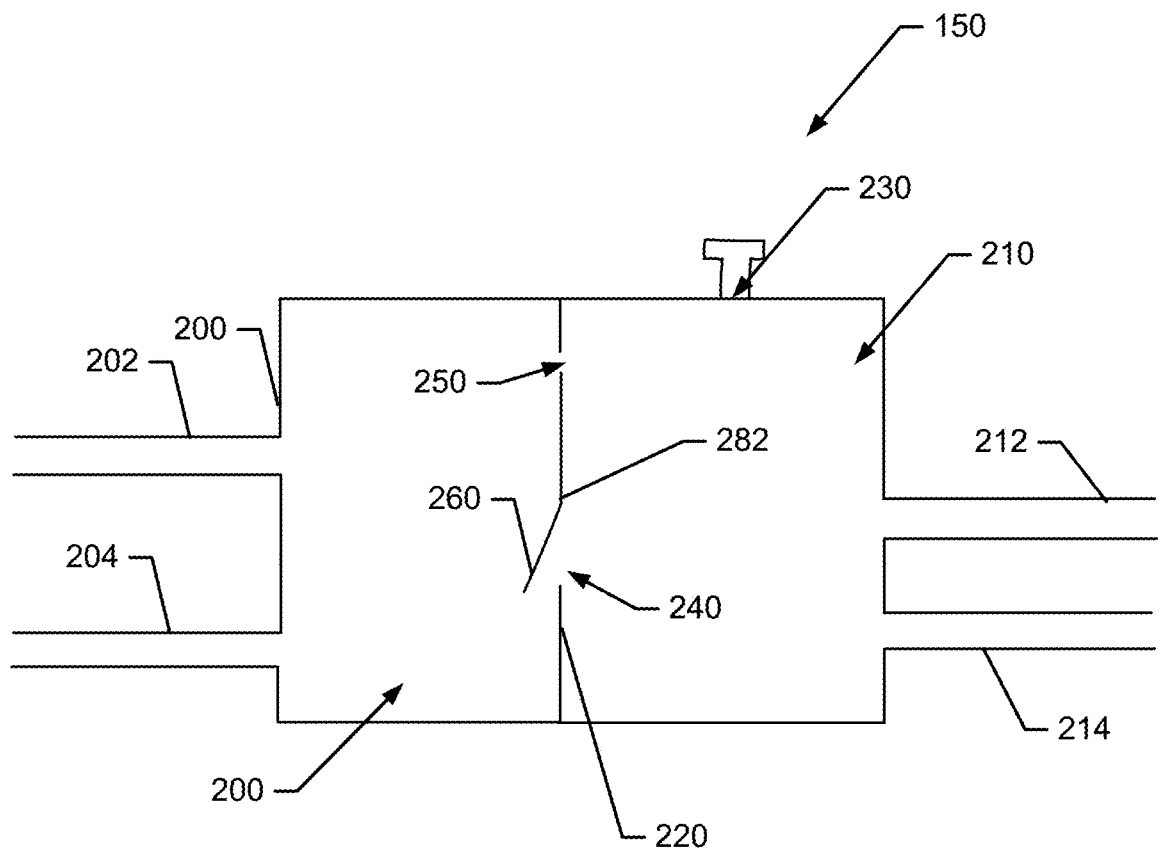
FIG. 2 illustrates a concept view of a multi-circuit degas bottle in accordance with an example embodiment.

FIG. 2 illustrates a concept view of the degas bottle 150 of an example embodiment. In this regard, as shown in FIG. 2, the degas bottle 150 may include a first chamber 200 that is operably coupled to the first cooling circuit 110 via an inlet line 202 and an outlet line 204. The first chamber 200 may be a single compartment or, in some cases, may include sub-chambers. The degas bottle 150 may also include a second chamber 210 operably coupled to the second cooling circuit 130 via an inlet line 212 and an outlet line 214. The second chamber 210 may also either be a single compartment or include sub-chambers.

In an example embodiment, the first and second chambers 200 and 210 of the degas bottle 150 may be separated from each other by a divider 220 or wall. The degas bottle 150 may further include a fill port 230 formed at a top portion of the second chamber 210. Cooling fluid can be directly added to the second chamber 210 via the fill port 230. This addition of cooling fluid may typically occur when the vehicle 100 is in a non-operating or non-operational state.

The divider 220 may insulate and isolate cooling fluid in the first chamber 200 from cooling fluid in the second chamber 210. However, in some cases, a connection passage 240 may be formed in the divider 220 to connect the first and second chambers 200 and 210. The connection passage 240 may be formed at a portion of the divider 220 that is elevated with respect to (or spaced apart from) a bottom surface of the degas bottle 150. Thus, when the cooling fluid that is poured into the fill port 230 reaches a level of the connection passage 240 within the second chamber 210, indirect filling of the first chamber 200 may commence due to the cooling fluid of the second chamber 210 spilling into the first chamber 200 via the connection passage 240. An air passage 250 may be formed in the divider 220 at an even higher elevation (relative to the bottom surface of the degas bottle 150) than the connection passage 240. In this regard, the air passage 250 may be formed at a level that is above a maximum fill level 252 defined for the degas bottle 150 so that the level of the cooling fluid does not reach the air passage 250 in order to allow pressure in the first chamber 200 to escape to the second chamber 210 (and out of the degas bottle 150 via a cap (see cap 320 below) disposed in the fill port 230) in order to ensure that relatively even filling of the first and second chambers 200 and 210 occurs once the cooling fluid in the first and second chambers 200 and 210 reach the level of the connection passage 240. The air passage 250 may also, before system filling and when vacuum is drawn via the fill port 230, due to the connection passage 240 being blocked at that time (via flow restrictor 260 below), enable the vacuum to also be drawn in the first chamber 200. Thus, the air passage 250 both allows proper filling of the first chamber 200 during fill operations, and enables vacuum to be drawn in the first chamber 200.

If allowed to remain continuously open, the connection passage 240 would thermally couple the cooling fluids in each of the first and second chambers 200 and 210. However, this is undesirable (again for the reasons noted above). Accordingly, example embodiments may further include the provision of a flow restrictor 260 at the connection passage 240 to alternately permit filling of both the first and second chambers 200 and 210 when the vehicle 100 is non-operational (i.e., in the non-operating state) and thermally isolate the first chamber 200 from the second chamber 210 when the vehicle 100 is operational (i.e., in an operating state).

The flow restrictor 260 may be disposed at a portion of the divider 220 that is below the maximum fill level 252 of the degas chamber 150. The flow restrictor 260 may be configured to open to enable cooling fluid provided via the fill port 230, when the vehicle 100 is in the non-operational state, to flow from the second chamber 210 to the first chamber 200 via the connection passage 240. The flow restrictor 260 may also be configured to be closed when the vehicle 100 is in the operational state to prevent the cooling fluid from flowing between the first and second chambers 200 and 210 via the connection passage 240. This configuration of the flow restrictor 260 may be accomplished in several ways. However, in an example embodiment, the flow restrictor 260 may be embodied as a flap that is operably coupled to the divider 220 at a top portion of the flap. For example, the flap may be hingedly connected to the divider 220 at a top edge of the flap (and consequently also to a top portion of the connection passage 240). In some cases, the flap may be connected to the divider 220 via a living hinge 282 (shown in FIG. 2). In other words, the material from which the divider 220 is made may be the same material from which the flap and the living hinge 282 is made. In other examples, the flap may be connected to the divider 220 via a snap fit hinge (see element 330 of FIG. 9).

Figure 5:
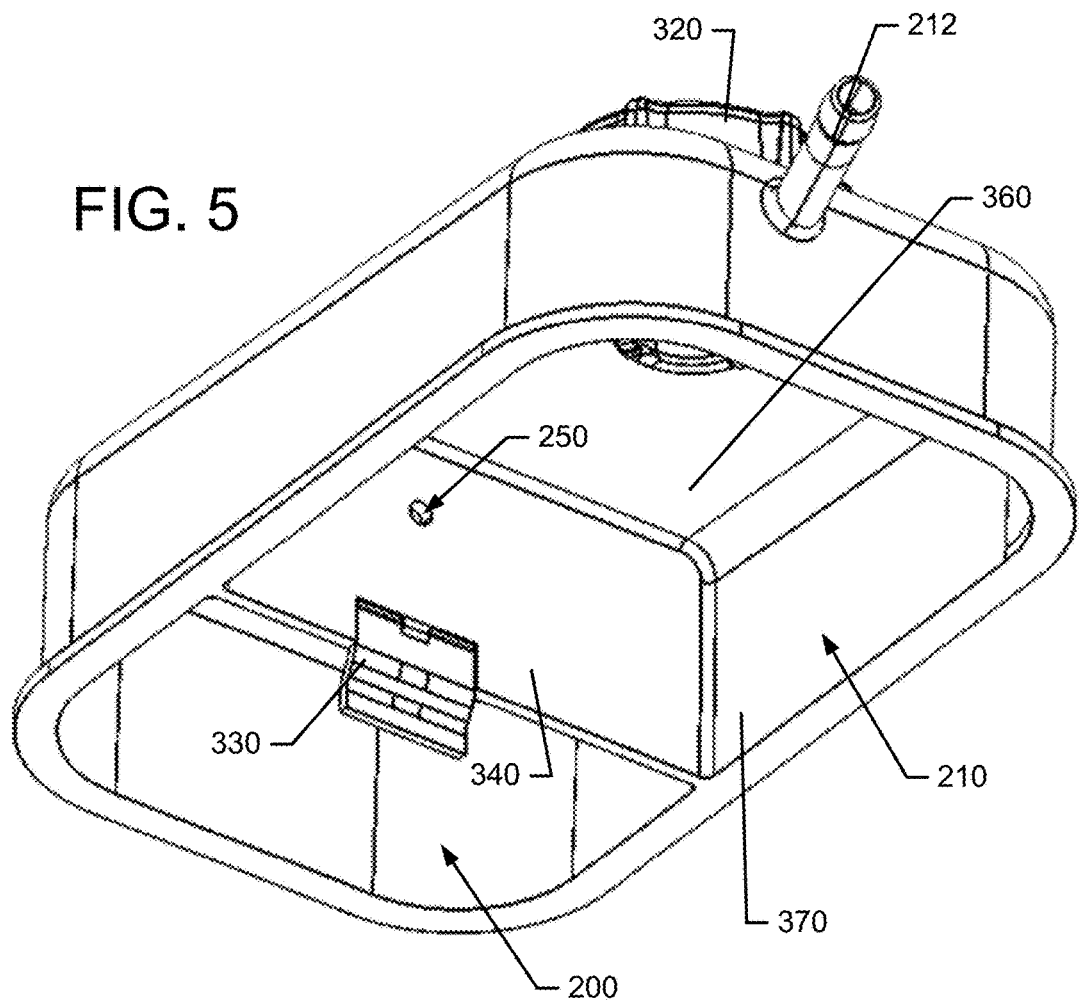
FIG. 5 illustrates a perspective view of an inside of a top portion of the degas bottle in accordance with an example embodiment.
Figure 6:
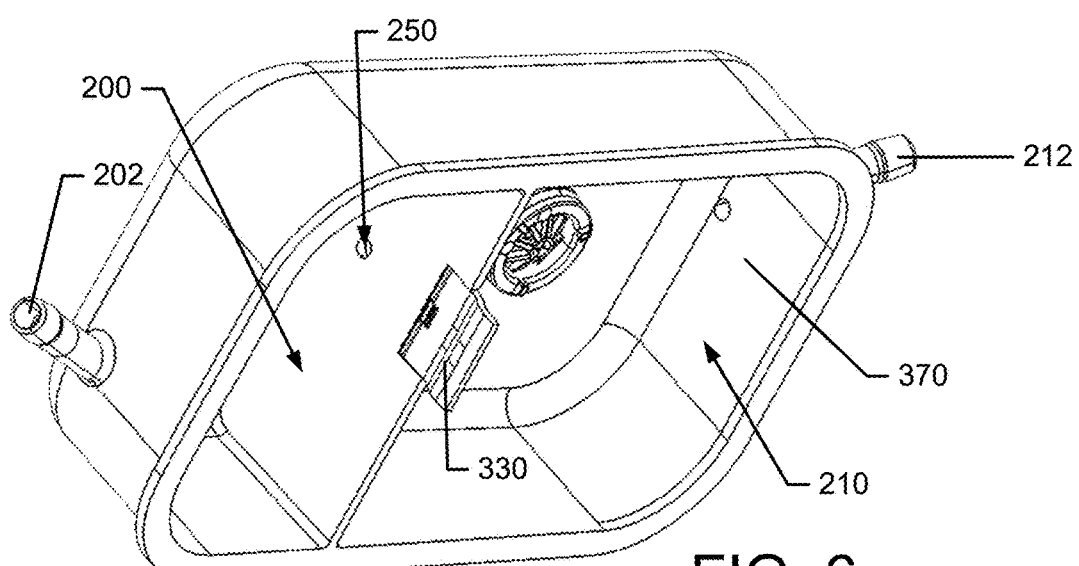
FIG. 6 illustrates another perspective view of the inside of the top portion of the degas bottle in accordance with an example embodiment.
Figure 7:
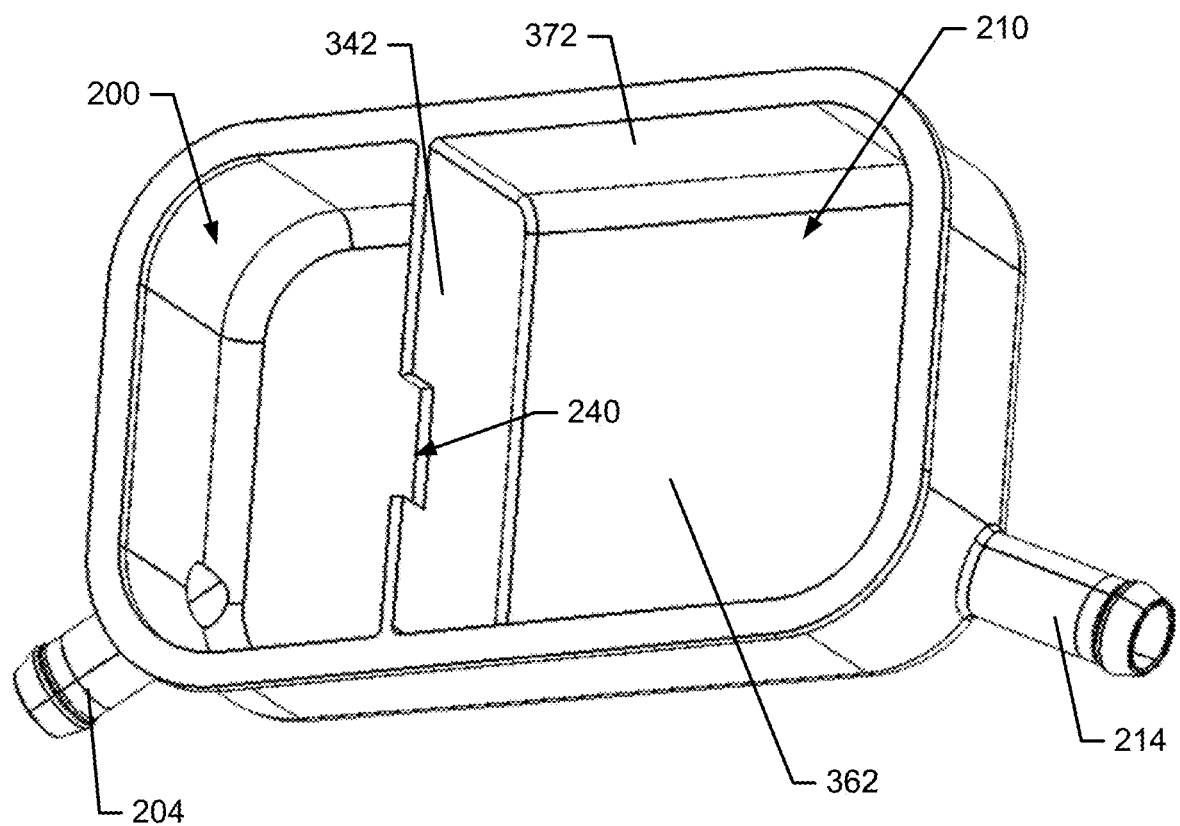
FIG. 7 illustrates a perspective view of an inside portion of a bottom portion of the degas bottle in accordance with an example embodiment.
Figure 10:
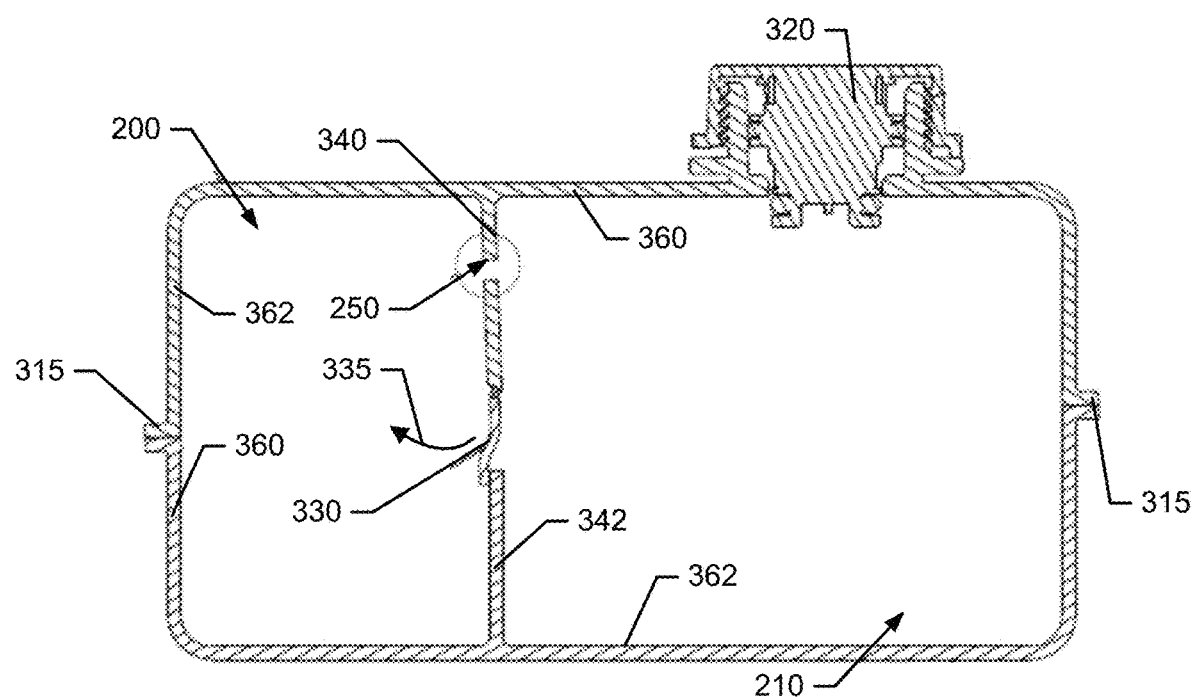
FIG. 10 illustrates a cross section view taken along a longitudinal centerline of the degas bottle in accordance with an example embodiment.

In an example embodiment, the degas bottle 150 may be formed of a plastic or resin material that is easily moldable. Thus, for example, polypropylene or other thermoplastic materials may be used to form the degas bottle 150. FIGS. 3-10 illustrate various views of portions of the degas bottle 150 of an example embodiment. In this regard, FIG. 3 illustrates a perspective view of the degas bottle 150 in an assembled state, whereas FIG. 4 shows an exploded view of the degas bottle 150. FIGS. 5 and 6 illustrate two different perspective views of an inside of a half shell of the degas bottle 150, and FIG. 7 illustrates a perspective view of an inside portion of another half shell of the degas bottle 150. FIGS. 8 and 9 illustrate portion of the degas bottle 150 that correspond to the flow restrictor 260 of one specific example. FIG. 10 illustrates a cross section view taken along a longitudinal centerline of the degas bottle 150.

Referring now to FIGS. 3-10, it can be appreciated that the degas bottle 150 may be formed from two (or more) separate components that can be assembled together. When two separate components are employed, each respective one may be considered to be a half shell. The half shells could correspond to right and left halves or top and bottom halves in some cases. However, the half shells need not specifically divide the degas bottle 150 in equal halves, nor along specific directionally distinct boundaries. Thus, in this example, the two half shells will be more generally referred to as a first bottle portion 300 (e.g., a top portion) and a second bottle portion 310 (e.g., a bottom portion).

The first and second bottle portions 300 and 310 may be separately formed by molding or any other suitable process. After being molded separately, the first and second bottle portions 300 and 310 may be joined together at a seam 315. In examples where the first and second bottle portions 300 and 310 may each be made of a thermoplastic material, and the first and second bottle portions 300 and 310 may be hot plate welded to each other at the seam 315.

The fill port 230 of the degas bottle 150 may be covered with a cap 320. The cap 320 of an example embodiment may include one or more relief valves therein. For example, the cap 320 may include two pressure relief valves, where one valve relieves to prevent over-pressure in the degas bottle 150, and the other valve relieves to prevent too much vacuum from being drawn in the degas bottle 150. The cap 320 may be removed to expose the fill port 230 so that cooling fluid can be poured or otherwise inserted into the second chamber 210 directly (and the first chamber 200 indirectly). Once the second chamber 210 fills to a level equal to a bottom of the connection passage 240, the flow restrictor 260 (embodied as flap 330 in FIGS. 3-10) may be displaced in the direction of arrow 335 (see FIG. 10) to permit spill over through the connection passage 340 and into the first chamber 200. This spill over will continue until the level of cooling fluid in the first chamber 200 equals that of the second chamber 210. Thereafter cooling fluid levels in both the first and second chamber 200 and 210 may be enabled to rise substantially simultaneously with the air passage 250 enabling air from the first passage 200 to escape into the second passage 210 and ultimately out through the fill port 230 during filling. However, as noted above, the air passage 250 also serves to enable vacuum to be drawn in the first chamber 200 prior to system operation.

When there is no flow between the first and second chambers 200 and 210 in the non-operational state (e.g., immediately after conducting a fill operation), the levels in each of the first and second chambers 200 and 210 are likely to be equalized. When there is no flow, the weight of the flap 330 may be sufficient to cause the flap 330 to move in a direction opposite that of arrow 335 in order to effectively plug the connection passage 240 with the flap 330. Thus, for example, a width of the flap 330 may be slightly larger than a width of the connection passage 240. A length of the flap 330 may be larger than a length of the connection passage 240 so that when the flap 330 is seated against the sides of the connection passage 240, flow through the connection passage 240 is prevented. This flow prevention is particularly notable from the first chamber 200 to the second chamber 210 where attempted back flow (i.e., flow from the first chamber 200 to the second chamber 210) is generally prevented such that the flap 330 operates similar to a check valve relative to back flow, but the flap 330 generally operates better than an actual check valve would in this situation since a relatively large check valve would be required to achieve the same flow that is otherwise provided by the flap 330. Moreover, since the first cooling circuit 110 generally operates at higher temperatures than the second cooling circuit 130, the cooling fluid in the first chamber 200 can generally be expected to be at a higher temperature than the cooling fluid in the second chamber 210 when the vehicle 100 is operational. The higher temperature of the cooling fluid in the first chamber 200 may therefore be expected (especially during transient conditions associated with heat removal from the first component or system 120) to cause a corresponding higher pressure within the first chamber 200 to further tend to seat the flap 330 (i.e., bias the flap 330 to a closed position) and prevent back flow. When the system operates under a vacuum (which is normally a non-operational condition, as noted above), the flap 330 will also be drawn to seat against the divider 220 and close the connection passage 240. As such, the thermal isolation that is desirable between the first and second cooling circuits 110 and 130 can be maintained in both the operational state and non-operational state.

In some cases, due to the two-piece construction mentioned above, the divider 220 may include a first divider portion 340 formed in the first bottle portion 300 as a first vertical wall extending downward from a top surface 360 of the first bottle portion 300. The divider 220 may also include a second divider portion 342 formed in the second bottle portion 310 as a second vertical wall extending upward from a bottom surface 362 of the second bottle portion 310. Thus, the divider 220 (as defined by the first and second divider portions 340 and 342) may extend continuously in between sidewalls 370 and 372 of the first and second bottle portions 300 and 310, respectively, with the exception of the connection passage 240 and the air passage 250. Thus, it should be appreciated that the air passage 250 and/or the connection passage 240 may each be formed by either removing material from the otherwise continuous divider 220 or providing an absence of material at corresponding locations of the divider 220.

In this regard, for example, the connection passage 240 may be formed from an absence of material at a bottom part of the first divider portion 340 and at a corresponding top part of the second divider portion 342 when the first and second divider portions 340 and 342 are proximate to each other. To the contrary, the air passage 250 may be disposed entirely in the first divider portion 340.

Although the flow restrictor 260 could be a living hinge 282 as shown in FIG. 2, a snap fit hinge may alternatively be employed. FIGS. 8 and 9 illustrate one example structural implementation for the snap fit hinge. In this regard, for example, the snap fit hinge may include a beam 400 and a snap fit socket 410 that may be configured to retain the beam 400 so that the beam 400 can pivot relative to the snap fit socket 410. Although FIGS. 8 and 9 show an example in which the beam 400 is disposed at a top of the flap 330 and the snap fit socket 410 is disposed at part of the first divider portion 340 that is adjacent to the top of the connection passage 240, this arrangement could alternatively be reversed. In either case, the flap 330 is permitted to pivot to close (either under its own weight or due to transient pressure gradients or differences created by higher temperatures in the first chamber 200) or to open when a filling operation is in progress.

A vehicle cooling system may therefore be provided. The vehicle cooling system may include a first cooling circuit having a first operating temperature range when the vehicle is in an operational state, a second cooling circuit having a second operating temperature range when the vehicle is in the operational state, and a degas bottle. The first operating temperature range may be higher than the second operating temperature range. The degas bottle may have a first chamber operably coupled to the first cooling circuit and a second chamber operably coupled to the second cooling circuit. The degas bottle may include a fill port operably coupled to the second chamber and a flow restrictor disposed at a divider separating the first chamber and the second chamber. The flow restrictor may be configured to open to enable cooling fluid provided via the fill port, when the vehicle is in a non-operational state, to flow from the second chamber to the first chamber and configured to be closed when the vehicle is in the operational state to prevent the cooling fluid from flowing between the first and second chambers.

The vehicle cooling system (or the degas bottle) of some embodiments may include additional features, modifications, augmentations and/or the like to achieve further objectives or enhance operation. The additional features, modifications, augmentations and/or the like may be added in any combination with each other. Below is a list of various additional features, modifications, and augmentations that can each be added individually or in any combination with each other. For example, the flow restrictor may include a flap hinged from a top edge of the flap to a portion of the divider proximate to a connection passage formed in the divider to connect the first and second chambers. In an example embodiment, the flap may be connected to the divider via a living hinge. As an alternative, the flap may be connected to the divider via a snap fit hinge comprising a beam (e.g., on the top of the connection passage or on the top of the flap) and a snap fit socket (e.g., on the top of the flap or the top of the connection passage). In an example embodiment, the divider may further include an air passage formed at a portion of the divider above the connection passage, and above a maximum fill level of the degas bottle. In some cases, the degas bottle may be formed from a first bottle portion (e.g., a top portion) and a second bottle portion (e.g., a bottom portion). The first and second bottle portions may be separately formed and joined together at a seam. In an example embodiment, the first and second bottle portions may each be made of a thermoplastic material, and the first and second bottle portions may be hot plate welded to each other. In some cases, the divider may include a first divider portion formed in the first bottle portion as a first vertical wall extending downward from a top surface of the first bottle portion. The divider may also include a second divider portion formed in the second bottle portion as a second vertical wall extending upward from a bottom surface of the second bottle portion. In an example embodiment, the connection passage may be formed from an absence of material at a bottom part of the first divider portion and at a corresponding top part of the second divider portion when the first and second divider portions are proximate to each other, and the air passage may be disposed in the first divider portion. In some cases, the weight of the flow restrictor may bias the flow restrictor toward a closed position, and temperature differences between cooling fluid in the first chamber and the second chamber may further bias the flow restrictor toward the closed position when the vehicle is in the operational state.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle cooling system comprising:
a first cooling circuit having a first operating temperature range when the vehicle is in an operational state;
a second cooling circuit having a second operating temperature range when the vehicle is in the operational state, the first operating temperature range being higher than the second operating temperature range; and
a degas bottle having a first chamber operably coupled to the first cooling circuit and a second chamber operably coupled to the second cooling circuit,
wherein the degas bottle comprises a fill port operably coupled to the second chamber and a flow restrictor disposed at a divider separating the first chamber and the second chamber,
wherein the flow restrictor is configured to open to enable cooling fluid provided via the fill port, when the vehicle is in a non-operational state, to flow from the second chamber to the first chamber and configured to be closed when the vehicle is in the operational state to prevent the cooling fluid from flowing between the first and second chambers.

2. The vehicle cooling system of claim 1, wherein the flow restrictor comprises a flap hinged from a top edge of the flap to a portion of the divider proximate to a connection passage formed in the divider to connect the first and second chambers.

3. The vehicle cooling system of claim 2, wherein the flap is connected to the divider via a living hinge.

4. The vehicle cooling system of claim 2, wherein the flap is connected to the divider via a snap fit hinge comprising a beam and a snap fit socket.

5. The vehicle cooling system of claim 2, wherein the divider further comprises an air passage formed at a portion of the divider above the connection passage, and above a maximum fill level of the degas bottle.

6. The vehicle cooling system of claim 2, wherein the degas bottle is formed from a first bottle portion and a second bottle portion, the first and second bottle portions being separately formed and joined together at a seam.

7. The vehicle cooling system of claim 6, wherein the first and second bottle portions each comprise a thermoplastic material, and
wherein the first and second bottle portions are hot plate welded to each other.

8. The vehicle cooling system of claim 6, wherein the divider comprises a first divider portion formed in the first bottle portion as a first vertical wall extending downward from a top surface of the first bottle portion, and
wherein the divider comprises a second divider portion formed in the second bottle portion as a second vertical wall extending upward from a bottom surface of the second bottle portion.

9. The vehicle cooling system of claim 8, wherein the connection passage is formed from an absence of material at a bottom part of the first divider portion and at a corresponding top part of the second divider portion when the first and second divider portions are proximate to each other, and
wherein the air passage is disposed in the first divider portion.

10. The vehicle cooling system of claim 1, wherein weight of the flow restrictor biases the flow restrictor toward a closed position, and
wherein temperature differences between cooling fluid in the first chamber and the second chamber further bias the flow restrictor toward the closed position when the vehicle is in the operational state.

11. A multi-circuit degas bottle for a vehicle cooling system comprising a first cooling circuit having a first operating temperature range when the vehicle is in an operational state, and a second cooling circuit having a second operating temperature range when the vehicle is in the operational state, the first operating temperature range being higher than the second operating temperature range, the multi-circuit degas bottle comprising:
a first chamber operably coupled to the first cooling circuit;
a second chamber operably coupled to the second cooling circuit;
a fill port operably coupled to the second chamber; and
a flow restrictor disposed at a divider separating the first chamber and the second chamber,
wherein the flow restrictor is configured to open to enable cooling fluid provided via the fill port, when the vehicle is in a non-operational state, to flow from the second chamber to the first chamber and configured to be closed when the vehicle is in the operational state to prevent the cooling fluid from flowing between the first and second chambers.

12. The multi-circuit degas bottle of claim 11, wherein the flow restrictor comprises a flap hinged from a top edge of the flap to a portion of the divider proximate to a connection passage formed in the divider to connect the first and second chambers.

13. The multi-circuit degas bottle of claim 12, wherein the flap is connected to the divider via a living hinge.

14. The multi-circuit degas bottle of claim 12, wherein the flap is connected to the divider via a snap fit hinge comprising a beam and a snap fit socket.

15. The multi-circuit degas bottle of claim 12, wherein the divider further comprises an air passage formed at a portion of the divider above the connection passage, and above a maximum fill level of the degas bottle.

16. The multi-circuit degas bottle of claim 12, wherein the degas bottle is formed from a first bottle portion and a second bottle portion, the first and second bottle portions being separately formed and joined together at a seam.

17. The multi-circuit degas bottle of claim 16, wherein the first and second bottle portions each comprise a thermoplastic material, and
    wherein the first and second bottle portions are hot plate welded to each other.

18. The multi-circuit degas bottle of claim 16, wherein the divider comprises a first divider portion formed in the first bottle portion as a first vertical wall extending downward from a top surface of the first bottle portion, and
    wherein the divider comprises a second divider portion formed in the second bottle portion as a second vertical wall extending upward from a bottom surface of the second bottle portion.

19. The multi-circuit degas bottle of claim 18, wherein the connection passage is formed from an absence of material at a bottom part of the first divider portion and at a corresponding top part of the second divider portion when the first and second divider portions are proximate to each other, and
    wherein the air passage is disposed in the first divider portion.

20. The multi-circuit degas bottle of claim 11, wherein weight of the flow restrictor biases the flow restrictor toward a closed position, and
    wherein temperature differences between cooling fluid in the first chamber and the second chamber further bias the flow restrictor toward the closed position when the vehicle is in the operational state due to transient pressure difference between the first and second chambers.

* * * * *